(12) United States Patent  
VanBrunt et al.

(10) Patent No.: US 7,282,372 B2  
(45) Date of Patent: Oct. 16, 2007

(54) FLUID MEASUREMENTS IN A REACTION VESSEL USED IN CONJUNCTION WITH A CLINICAL ANALYZER

(75) Inventors: Nicholas VanBrunt, Rochester, NY (US); Randy K. Bower, Pittsford, NY (US); Robert A. Burkovich, Pittsford, NY (US); Joseph J. Dambra, Rochester, NY (US)

(73) Assignee: Ortho-Clinical Diagnostics, Inc., Rochester, NY (US)

( * ) Notice: Subject to any disclaimer, the term of this patent is extended or adjusted under 35 U.S.C. 154(b) by 335 days.

(21) Appl. No.: 10/263,069

(22) Filed: Oct. 2, 2002

(65) Prior Publication Data

US 2004/0067164 A1 Apr. 8, 2004

(51) Int. Cl.  
*G01N 1/10* (2006.01)

(52) U.S. Cl. .................. 436/180; 436/55; 436/148
(58) Field of Classification Search .............. 436/55, 436/148, 150; 422/106  
See application file for complete search history.

(56) References Cited

U.S. PATENT DOCUMENTS

| | | | |
|---|---|---|---|
| 3,769,841 A * | 11/1973 | Thulin | 222/445 |
| 3,921,460 A | 11/1975 | Schmidlin | |
| 4,880,039 A * | 11/1989 | Horak | 141/1 |
| 4,977,528 A * | 12/1990 | Norris | 702/100 |
| 5,012,683 A | 5/1991 | Davis | |
| 5,045,286 A | 9/1991 | Kitajima et al. | |
| 5,275,951 A | 1/1994 | Chow et al. | |
| 5,481,900 A * | 1/1996 | Husar | 73/114 |
| 5,544,518 A * | 8/1996 | Hart et al. | 73/1.73 |
| 5,627,522 A | 5/1997 | Walker et al. | |
| 5,648,727 A | 7/1997 | Tyberg et al. | |
| 5,658,800 A | 8/1997 | Lessard et al. | |
| 6,212,949 B1 | 4/2001 | Inder et al. | |

FOREIGN PATENT DOCUMENTS

| | | |
|---|---|---|
| DE | 4437610 A1 | 4/1996 |
| EP | 1 116 953 A2 | 7/2001 |
| EP | 1116953 A2 | 7/2001 |

OTHER PUBLICATIONS

European Search Report of corresponding European Patent Application No. 03256214.2, dated Mar. 29, 2007; 3 pgs.

* cited by examiner

*Primary Examiner*—Yelena G. Gakh  
(74) *Attorney, Agent, or Firm*—Marjama Muldoon Blasiak & Sullivan LLP

(57) ABSTRACT

A method for measuring the amount of fluid contained in a reaction vessel in a clinical analyzer includes the steps of adding a first aliquot of fluid to the reaction vessel and measuring the quantity of fluid contained therein. A second aliquot of fluid is then added to the reaction vessel and the quantity of fluid contained therein is also measured. Measurement of the two fluid quantities can occur with or without removal of the first aliquot in between measurements. In obtaining the two quantity measurements and comparing them against a standard, the effects of well geometry can be minimized. Preferably, a delta or ratio measurement is obtained between the first and second liquid volume measurements which can be compared against a standard so as to normalize apparent volume losses or gains due to reaction well dimensional variation. This approach enhances the analytical capability to detect true fluid delivery errors.

15 Claims, 9 Drawing Sheets

FLUID MEASUREMENTS IN A REACTION VESSEL USED IN CONJUNCTION WITH A CLINICAL ANALYZER

FIELD OF THE INVENTION

The invention relates to the field of analyte measurement and in particular to a reliable method for determining fluid volumes in a reaction well wherein well geometry and other metering discrepancies can be accounted for in liquid volume determinations.

BACKGROUND OF THE INVENTION

Known clinical analyzers are employed for testing a large number of sample fluids for a particular analyte(s) of interest. In analyzers having so-called wet chemistry systems, sample fluid is typically placed in a sample reaction vessel, such as a cup or tube, in the analyzer so that aliquots can be dispensed or metered. Structurally within the analyzer, a probe or proboscis using appropriate fluidics such as pumps, valves, liquid transfer lines such as pipes or tubing, and driven by, pressure or vacuum are often used to meter and transfer a predetermined quantity of sample from the sample vessel to a reaction vessel. The sample probe or proboscis or a different probe or proboscis is also required to deliver diluent to the reaction vessel, particularly where a relatively large amount of analyte is expected or found in the sample. A wash solution and process are generally needed to clean a nondisposable metering probe. Here to, fluidics are necessary in order to accurately meter and deliver wash solutions and diluents.

In addition to sample preparation and delivery, the action taken on the sample requiring measurement often requires dispensing of at least one reagent, substrate, or other substance that combines with the sample to produce some noticeable event such as fluorescence, absorbance of light or chemiluminescence. Several different substances are frequently combined with the sample in order to attain the detectable event. This is particularly true with immunoassays since they often require multiple reagents and wash steps. Reagent metering systems are used in order to accomplish the above tasks. Generally, these metering systems also require a wash process in order to avoid carryover. Therefore, these systems also include fluidics in order to expedite the cleaning of a probe or proboscis and the addition of a signal reagent that reacts with bound analytes to produce a chemiluminescent effect.

A device located within the analyzer, such as a luminometer, can then be used to determine the appropriate measured quantity, such as light absorbance by the bound sample.

The sample and reagent delivery systems often require the accurate and very precise transport of small volumes of liquids. Therefore and in certain prior art clinical analyzers, redundant detection schemes have been introduced for detecting incorrect volumes of fluid which are being delivered to a reaction well or vessel by the various fluidic metering subsystems of the analyzer. The intent of these detection schemes is to suppress incorrect results that occur from either too much fluid or too little fluid being delivered into a reaction well. Incorrect results can greatly influence the efficacy of testing, particularly in systems utilizing very small metering volumes. According to one exemplary indirect detection scheme, measurements are taken between reagent metering events rather than by measuring fluid levels directly in the reaction well.

For example and in the case of the metering of signal reagent (hereinafter referred throughout as "SR"), a nominal fluid volume that is delivered to the reaction well or vessel is approximately 200 microliters, while a typical fluid volume of sample and reagent (hereinafter referred to as S+R) which can include a fluid volume of the combination of reagent A and/or reagent B and patient sample is approximately 100 to 180 microliters.

For purposes of measurement, a capacitance or other type of sensing technique, is usually employed. In brief, a well wash probe is lowered to the reaction vessel via manipulation of a stepper motor with each step being counted by a data processing system. In a preferred embodiment, vertical drive resolution is approximately 39 steps per mm. The lowering process continues until the tip of the well wash probe which contains a capacitance sensor, contacts fluid. The height of the descent is then converted into a volumetric measurement of the total of fluid (sample, reagent, sample+reagent, well wash and signal reagent) via a formula, or by reference to a table or database made from a formula or derived empirically. A suitable formula, for example, is readily derived by empirically establishing the proper height, graphically depicting the descent of the well wash probe until contact is made in a vessel (according to scale) using a commercial CAD software tool, and querying the CAD program to produce the equation that converts the height to volume.

In terms of an error budget to ascertain fluid volumes, a major portion of this budget is accounted for by the geometry of reaction well; that is, a significant contributor is whether the reaction well is large or small in geometry as a result of well manufacture. For example, and referring to FIG. 1, a nominal reaction vessel or well 135 is compared to typical large and small vessels 135a, 135b, respectively. Using the above capacitance sensing technique, a large reaction vessel 135a, due to its larger overall size and depth, will indicate an apparent decrease in the amount of fluid volume sensed since the volume measurement is based on the height of the fluid present in the vessel. Similarly, a small reaction vessel 135b will indicate an apparent increase in fluid volume as compared to the nominal reaction well 135, in spite of the fact that each of the above vessels, in reality, have each had a nominal fluid volume dispensed. The above discrepancies between large and small wells are due to manufacturability, but it will be apparent that the ability to accurately screen for well geometry is essential, especially when small or microvolumes on the order of those noted above, are being dispensed.

Figure 1:
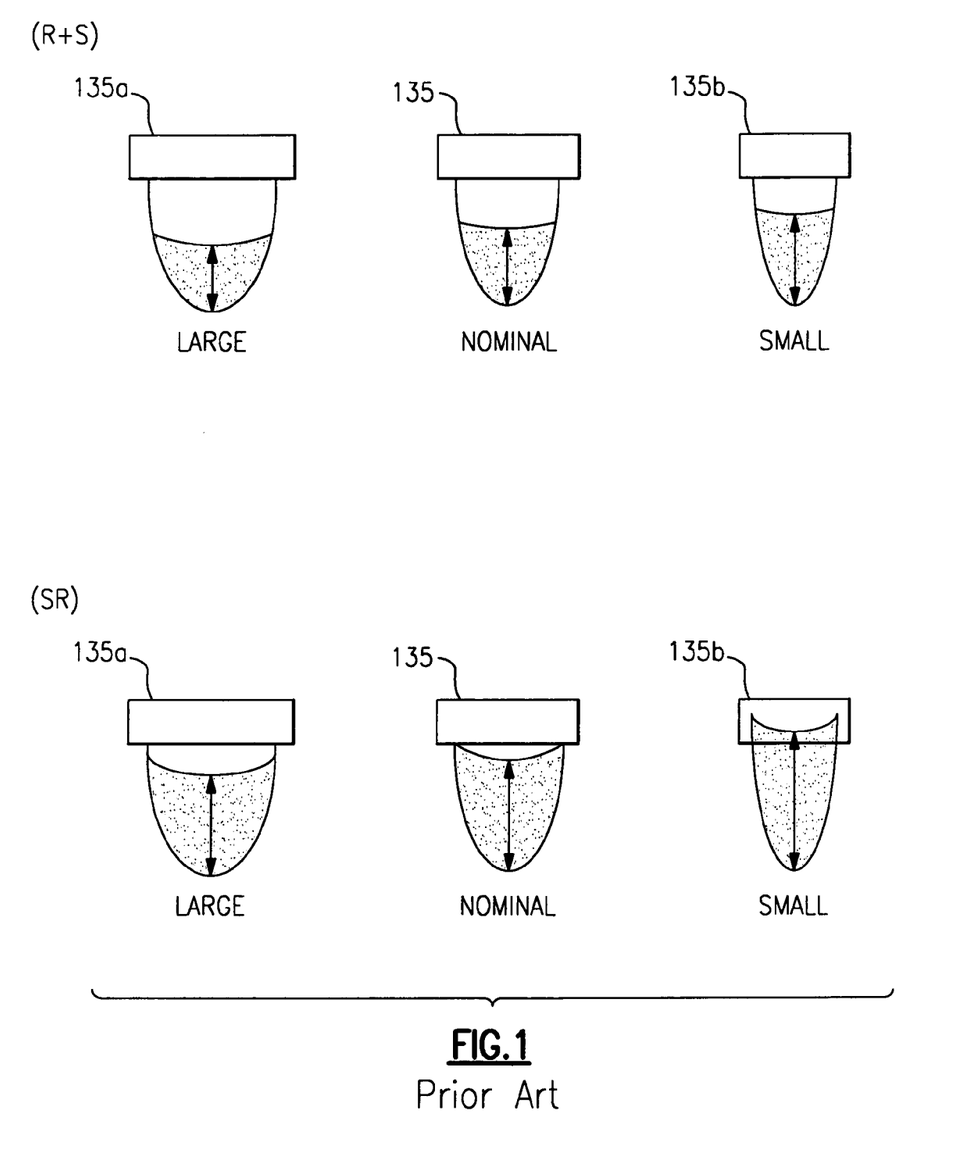
FIG. 1 is a side elevational view comparing a typical nominal reaction well, large reaction well, and a small reaction well, respectively.

If analytical test capability is to be enhanced, a testing strategy and mathematical algorithm needs to be developed to remove well geometry effects as well as those caused by other metering specific sources, from the total error budget. The above reasoning is true given that the volume contained in the reaction vessel is inferred from well height as opposed to a nominal well geometry. As noted, an internal well geometry that is large using commonly known capacitance sensing techniques to detect the volume will appear to have a decreased volume of fluid associated with the lower measured fluid height. Conversely, a small well geometry using the same measurement capacitance measurement technique will appear to have an increased volume of fluid associated with a higher fluid height as shown in FIG. 1. In addition, consideration should be made to other factors such as the meniscus formed at the top of the fluid column, as shown in FIG. 1, the extent of which varies depending not only on height of the fluid but also the properties of the fluid, (Signal reagent, sample, etc.) in the reaction vessel. A consideration which also contributes to the error budget is whether the probe is centered, as an off-center detection measurement will be affected by the above meniscus. Still another factor that is well specific involves the coatings applied thereto to bind analytes.

In terms of attempting to remove well geometry as a significant contributor to the overall error budget, gravimetric measurements of reaction wells could be measured both prior to and after fluid delivery can remove reaction well geometry as a contributor to the overall analytical error which is described above. However, this particular approach adds significant complexity and cost to the analyzer, as well as increasing the potential of degrading throughput and overall system reliability thereof.

Another alternate solution would be to significantly tighten the dimensional specifications of the reaction well (s). This solution, however, would be extremely costly given that the manufacturing molds for reaction vessels are high yield, multi-cavity and have a material/wear issue based on the use of titanium dioxide which is abrasive and causes mold wear. That is, mold maintenance and process control would increase while mold life would decrease, adding significant cost and complexity to the manufacturing of reaction wells.

SUMMARY OF THE INVENTION

It is therefore a primary object of the present invention to improve the accuracy of liquid level measurements for reaction vessels that are used in the conduction of assays in clinical analyzers.

A further primary object of the present invention is to improve the error measuring budget for measuring fluid levels by eliminating or at least substantially reducing the effects of reaction well geometry as contributing to a fluid volume measurement.

Therefore and according to a preferred aspect, there is provided a method for improved measurement of fluid volumes in a reaction vessel obtained by adding at least two fluids into the reaction vessel. The method takes into account the geometry of the reaction vessel and includes the step of developing a mathematical algorithm for each of the at least two fluids by correlating a height of an aliquot of each of the at least two fluids added to a standard reaction vessel. According to this step, the height is measured by a sensor with a volume of the aliquot of each of the at least two fluids, the volume being calculated from independent gravimetric measurements. According to this method, a first fluid from the at least two fluids is added to said reaction vessel and the first volume of the first fluid contained in said reaction vessel is measured by sensing the height of the first fluid in said vessel using the sensor and calculating the volume based on said sensed height using the mathematical algorithm for the first fluid. A second volume of a second fluid from the at least two fluids is added to said reaction vessel wherein the second volume of the second fluid contained in said reaction vessel is measured by sensing the height of the second fluid in said vessel using the sensor and calculating the volume based upon the sensed height using the mathematical algorithm for the second fluid. At least one of the ratio and the delta between the first and second measured volumes is then calculated and the at least one calculated ratio and delta is compared to a known reference for the standard vessel. The reaction vessel is discarded if the difference between the at least one calculated ratio and delta and the known standard exceeds a predetermined range of values.

The measuring steps are preferably accomplished using a capacitance sensing approach wherein the height of fluid is used to calculate the fluid volume in the reaction vessel, though other measuring techniques can be utilized. Preferable, a ratio or a delta is calculated between the second volume measurement and the first volume measurement with the calculated ratio or delta being compared to a standard. If the standard is exceeded, then the well can be discarded.

It has been established that both ratio and delta calculations can be used to normalize apparent volume errors driven by dimensional variation and to identify severe or egregious metering errors caused by other effects.

Put another way, fluid height measurements can be used as an initial or "coarse" screen while the above ratio/delta calculations provide an enhanced or "fine" filter to detect metering errors.

According to yet another preferred aspect, there is provided a method of compensating for manufacturing tolerance effects of a reaction vessel for purposes of performing volumetric measurements of at least two liquids added to said reaction vessel in a clinical analyzer. The clinical analyzer includes at least one metering device for aspirating liquids from at least one liquid supply of the analyzer and adding aspirated liquids to said reaction vessel. The method takes into account the geometry of the reaction vessel and includes the step of developing a mathematical algorithm for each of the at least two liquids by correlating a height of an aliquot of each of the at least two liquids added to a standard reaction vessel. According to this step, the height is measured by a sensor with a volume of the aliquot of each of the at least two liquids, the volume being calculated from independent gravimetric measurements. According to this method, a first volume of a first liquid is added into the reaction vessel using the at least one metering device and the first volume of the first added liquid is measured by sensing the height of fluid in said vessel using a sensor and the volume based on said sensed height is calculated using the mathematical algorithm of the first liquid. A second volume of a second liquid is then added into said reaction vessel using the same metering device used to add the first volume and the second volume of the at least second added liquid is measured by sensing the height of fluid in said vessel using the sensor and the volume is calculated based upon the sensed height using the mathematical algorithm of the second liquid. At least one of the delta and the ratio between the first liquid volume and the second liquid volume is then calculated at least wherein one calculated ratio and delta is compared to a known reference for the standard reaction vessel. The reaction vessel is discarded if the difference between the at least one calculated ratio and delta and the known standard exceeds a predetermined range of values.

Preferably, the analytical approach developed for removing well geometry variability from the error budget is to express fluid volume delivered by a first metering system relative to the volume of another fluid delivered by a second independent metering system in the same test or reaction vessel.

It should be noted that an underlying but reasonable assumption of the presently described method is that coincident failures on two independent metering systems is an extremely unlikely probability.

As described herein in greater detail, it has been determined that ratio levels (that is, measurements which are fractionally determined through division) are superior to delta levels (that is, subtracted values between volume measurements), though both techniques are effective, for example, in minimizing the effects of well geometry than mere height measurements such as presently used for computing volume.

According to yet another preferred aspect of the present invention, two or more of the fluids can be delivered and measured from the same metering system. In this instance, the dimensional variability of the reaction vessels is not accounted for, although reaction vessel coating type and thickness, meniscus shape and capacitance probe alignment can be accounted for. As such, at least some aspects of measurement variation can be compensated using the present method.

According to yet another preferred aspect of the present invention, therein is provided a system for detecting potential errors associated with at least one fluid metering system of a clinical analyzer, said system comprising:

a first filter means for detecting significant metering errors; and a second filter means for detecting the presence of metering errors which are not detachable by said first filter means.

A proposed logic sequence using either analytical approach would depend on the level of tolerance available. For example, if the tolerance level were on the order of about ±20 or 30 microliters, then there may be no general need for the ratio/delta portion of the method of the present invention. If there are health and safety concerns, then the logic would proceed to continue processing and not discard the sample and perform a ratio measurement. If this measurement exceeded the nominal specs of above, then the reaction well would be discarded. If not, then the processing would continue as before.

An advantage of the present invention is that reaction well geometry and other effects can be effectively compensated or normalized from a fluid volume measurement.

A further advantage of the presently described measurement method is that in addition to eliminating the large/small geometry effects of a reaction well, other interior well effects such as off-center probe positioning and well coating type and thickness errors, may also be minimized.

These and other objects, features, and advantages will become apparent based on the following Detailed Description which should be read in conjunction with the accompanying drawings.

DETAILED DESCRIPTION

The following discussion relates specifically to the measurement of fluid volumes in reaction wells that are used in an exemplary clinical blood analyzer, namely, the ECi analyzer manufactured by the Johnson and Johnson Company. It will be readily apparent, however, that the approaches discussed herein are meant to be more generally applicable throughout the industry.

Figure 2:
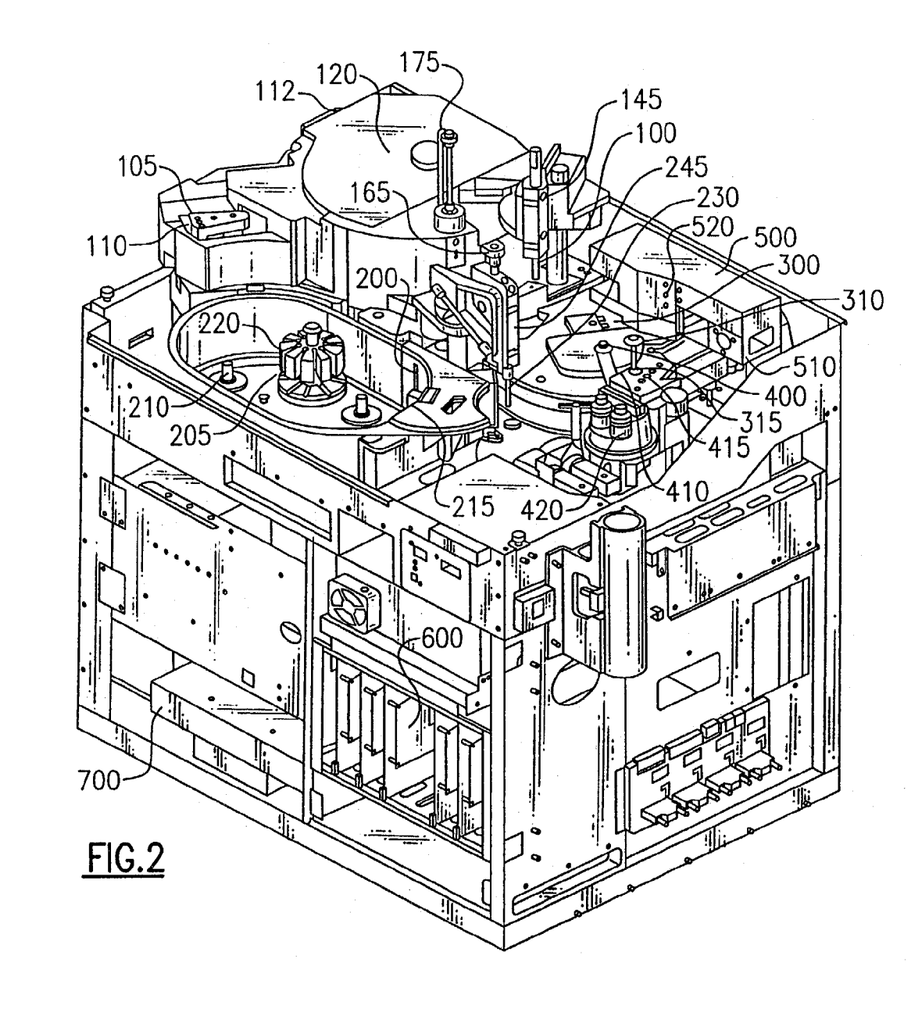
FIG. 2 is an isometric view of a clinical analyzer which utilizes the reaction wells of FIG. 1.
Figure 3:
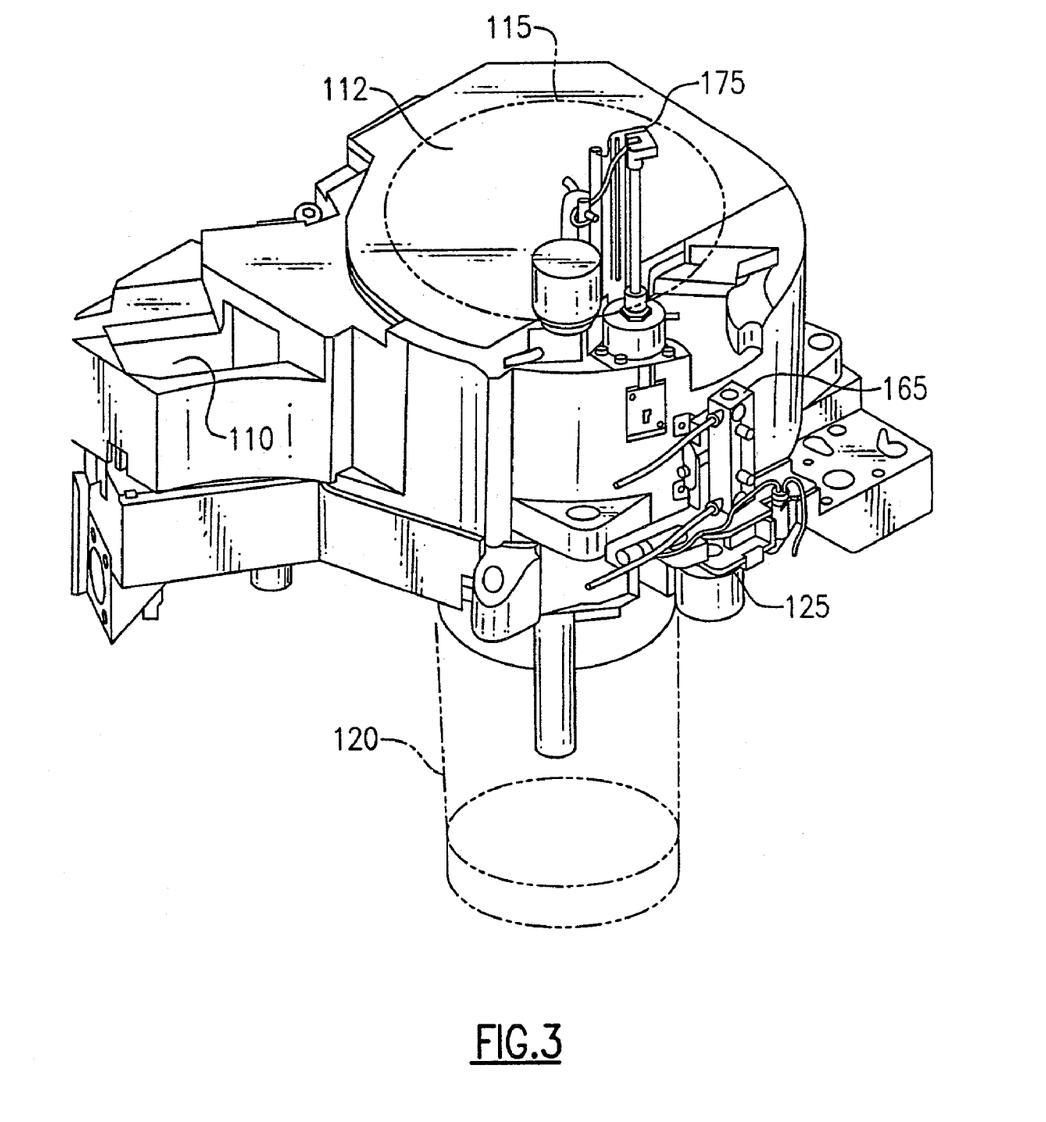
FIG. 3 is an isometric view of a portion of the reagent management system of the clinical analyzer of FIG. 2.

Referring to FIGS. 2 and 3, the basic operation of the above analyzer is first briefly discussed. The analyzer is designed to conduct automated enzyme immunoassays (EIAs) for analytes including hormones, vitamins, and related compounds, infectious disease markers, cancer markers, therapeutic drug monitoring, abused drug analysis, and other analytes amenable to analysis by EIA. To help further understand the present invention, the operation of the systems is broadly described with respect to the way an assay would be conducted on a sample.

The analyzer is categorized into systems of components and, where appropriate, those systems are categorized further into subsystems.

FIG. 2 shows the relationship of a reagent management system of the analyzer to the other systems while FIG. 3 shows portions of this system in greater detail.

The reagent management system conducts reagent scanning for input into the data processing mechanism of the analyzer and meters and dispenses reagent (such as wells 135 shown in FIG. 4 and described below) via a reagent probe 100. Reagent packs 105 are external to the system but are components which are manipulated by the reagent management system; they are configured to contain the reagents necessary to conduct an immunoassay. Typically, they include one or more antigenic or antisera components used to combine with the analyte and provide adhesion to or with a reaction vessel. Preferably, reagent packs 105 are configured with a supply of reaction vessels, such as reaction wells of an appropriate volume and geometry for the assay. Preferably, 0.35 ml conical wells coated with a material complimentary to the reagents are used as reaction wells. Well coatings can comprise materials, such as streptavidin and/or other materials, useful for immunochemical analysis as is well known in the art to facilitate binding by a biotinylated antigen or antibody to which an analyte binds as part of the assay chemistry. A number of these well coatings are known and used depending on the assay and of themselves do not form an essential part of the invention except where indicated.

The reagent management system is comprised of a number of subsystems and components. An autoload station 110 shuttles reagent packs 105 to a reagent supply substation 112 by any suitable drive mechanism. Preferably, a system of epicyclic gears is used in which a geared ring is fitted with a slotted overlay which corresponds generally to the shape of the reagent pack 105. The reagent pack 105 is then inserted into a slot formed along a movable portion of the substation 112 and is driven in a circular motion by a pinion provided on the interior of the geared ring (shown schematically in phantom in FIG. 3). In this way, the reagent packs 105 can be stored for access and rotated to an appropriate position for aspiration and dispensing by the reagent management system.

The reagent management system further includes a reagent supply cooler 120 that cools the interior of the reagent supply substation 112 according to the functional requirements of the reagents, so as to maintain the reagents and reaction vessels at the appropriate humidity and temperature. A reagent well shuttle 125 extracts wells 135 and deposits them onto the outer ring 250 of an incubator 300, see FIG. 4. The wells 135 are extracted from their storage area (preferably in the reagent packs 105) by an extraction device (not shown) that comprises a portion of a well dispenser 175 functioning in concert with the reagent well shuttle 125. This can comprise, for example, any convenient mechanism such as a hydraulic plunger having a prong at one end corresponding to the shape of the well 135. This mechanism is preferably pivotable so that once grabbed, a well 135 can be moved to a portion of the analyzer wherein it can be filled with sample and/or reagent.

The reagent metering subsystem includes a reagent metering arm 145 having a reagent probe 100 movably attached to it. The reagent metering arm 145 is pivotable so that it can position the reagent probe 100 into a position to dispense reagent or diluent into a reaction vessel 135. The reagent probe 100 aspirates, transports, and dispenses reagent and/or diluent into reaction vessels 135 and is generally configured so that it also moves in a vertical direction to dip into reagents and lower itself into the vicinity of the reaction well. This vertical movement is accomplished by a stepper motor with fine steps (at least about 390 steps per cm of vertical motion are desired) connected to a rack and pinion drive though other mechanisms could be utilized. Where pivoting is required, a stepper motor with fine steps is also preferred (generally at least about 1720 steps per revolution of the shaft used to rotate the probe or probe arm are desired) with a drive pinion. Control of stepper motors is accomplished by well known techniques such as those described in U.S. Pat. No. 5,646,049, which is herein incorporated by reference.

Figure 5:
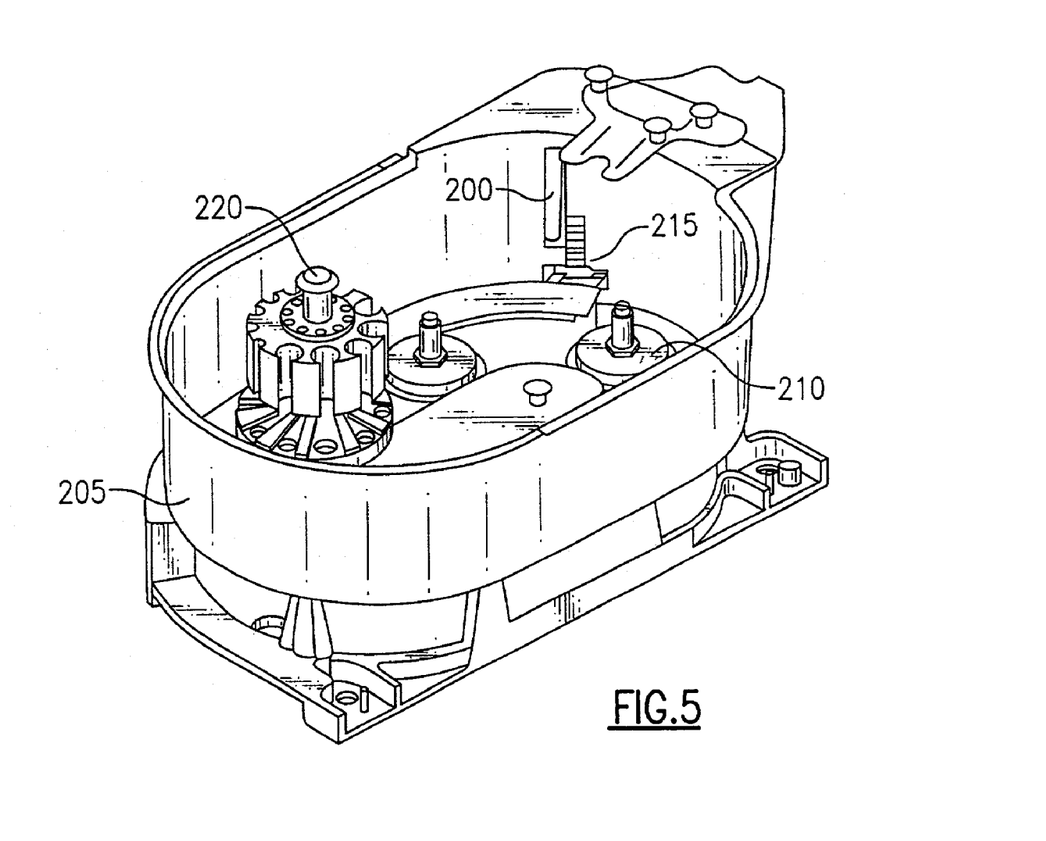
FIG. 5 is an isometric view of a sample management system of the clinical analyzer of FIG. 2.
Figure 6:
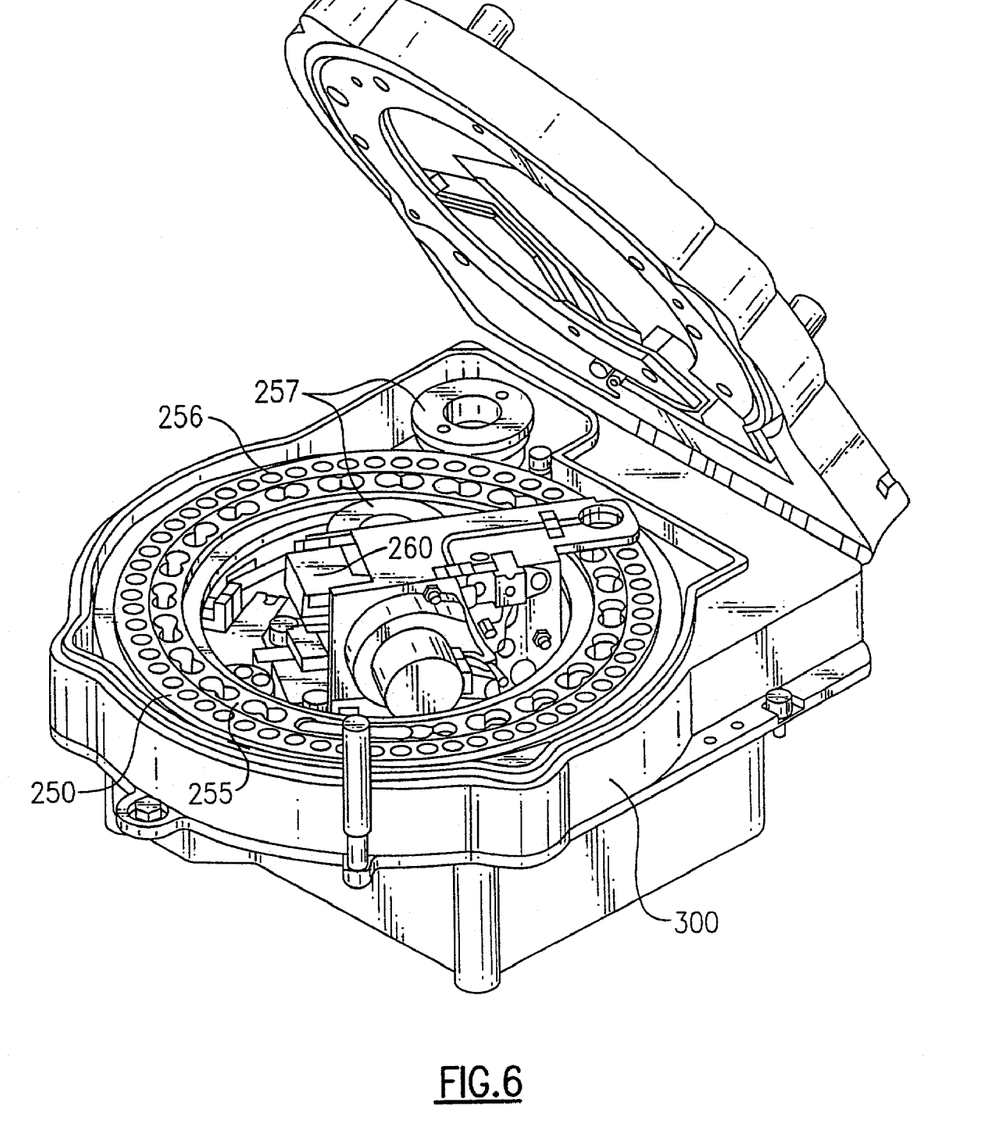
FIG. 6 is an isometric view of an incubator and various other subsystems of a processing system of the clinical analyzer of FIG. 2.

In the reagent metering subsystem, the reagent probe 100 aspirates and dispenses fluids via connection to fluidics systems comprised of valves, pumps, tubing, and the like. This system is preferably charged by vacuum and can disperse fluid by release of the vacuum or through pressurization. Whenever reagent metering involves aspirating and dispensing of different reagents, it is desirable to include a wash step so that the reagent metering probe 100 does not carry over reagent from one step of the assay into a different step of the assay or into a different assay. This helps avoid small inaccuracies. The above wash step involves flushing the reagent metering probe 100 with a wash fluid after delivery of each reagent component. Thus, the reagent probe 100 is also connected by fluidics to a wash solution. The reagent metering probe 100 can be charged and dispense wash fluid by vacuum or by pressure. As shown in FIG. 5, a reagent wash station 165 provides an enclosed space for the reagent metering probe 100 to conduct the wash step. In operation, the reagent metering probe 100 is lowered into a wash cylinder 175 of the wash station 165, wash fluid is charged through the probe and into the wash cylinder and evacuated through an outlet port 160. Wash fluid is also charged through a separate inlet port 170 to wash the exterior of the reagent metering probe 100.

Figure 4:
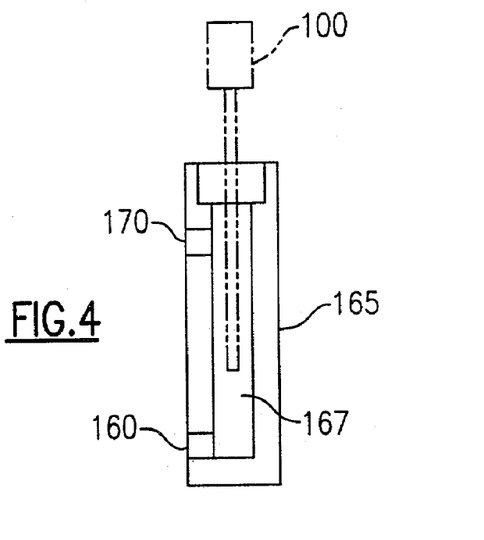
FIG. 4 is a cross-sectional side view of a reagent probe wash station.

Referring to FIGS. 2 and 4, a sample manipulation system is herein described that loads and meters sample to the appropriate reaction vessels, preferably wells 135. This system is also capable of providing input to the data processing systems via a bar code reader 200 that reads bar codes which may be placed on patient sample vessels, such as test tubes and the like. The sample manipulation system further includes a number of subsystems and components. The sample supply subsystem is one which is comprised of the bar code reader 200 for inputting sample identification data and a sample tray conveyor 205, one or more sample tray transports 210, and a positioner 215 for moving sample to a sample metering station located adjacent to the positioner.

The sample tray conveyor 205 propels a carousel 220 atop a sample tray transport 210, preferably having a magnetic or ferrous component attractive to a magnetic drive of the conveyor permitting the transport to move about an elliptical track. Alternately, other drive mechanisms can be used. In addition, the outer diameter of the sample tray is geared so that the tray can be rotated about its own central axis by a geared piece such as positioner 215 adjacent to bar code reader 200.

A sample metering subsystem aspirates samples and dispenses them into reaction vessels via the proboscis 230. The proboscis 230 and its related metering arm 245 are very similar in design to the reagent metering arm 145 described above. Disposable tips (not shown) through which sample can be aspirated and dispensed are preferably fitted onto the proboscis 230 and are disposed of after each aspiration and delivery of sample. The tips are preferably conical with the apex of the cone pointed downwardly. Appropriate robotic commands are used to position the proboscis 230 over a supply of the tips and then temporarily attach the tips via force (that is, through injection of the proboscis into the hollow portion of the tip). For convenience, the supply of tips can be maintained on a tip supply carousel (not shown). The tips can likewise be removed by raising the proboscis drive to its top-most travel, thereby activating an ejector sleeve (not shown). Generally, the above disposable tips are comprised of a molded thermoplastic such as polyethylene or polypropylene. Such tips avoid direct and repeated contact of sample and a proboscis end.

The sample metering subsystem functions similarly to that of the reagent metering system. Sample, which is loaded onto a sample carousel 230, is driven to a location which is reachable by the proboscis 230. After having loaded a disposable tip onto the proboscis 230, the system pivots the proboscis directly overhead a sample vessel. The proboscis 230 is then lowered into a vessel, such as a tube on the carousel, where it aspirates a quantity of sample sufficient for the assay to be conducted. The proboscis 230 is then pivoted to a position that is overhead a well residing in the outer ring 250 of an incubator, FIG. 4, where the sample is dispensed. It is preferable that the sample is dispensed into the well before reagent has been dispensed into the well. The proboscis can then be used to validate proper metering of the sample into the well. This is accomplished by fitting the proboscis 230 with a pressure, capacitance, optical or other form of sensor on the sample metering arm 245. The sensor is in communication with a transducer and the data processing system 600 of the analyzer. An optical sensor can also be used to home the proboscis to its proper position.

After metering and measuring the sample, reagent is preferably dispensed into the well 135 as described above. Mixing of sample and reagent is accomplished by dispensing reagent into the well containing sample with sufficient velocity to produce partial mixing. Further mixing is accomplished by moving the incubator rings 250, 255 at rapidly changing velocities.

Some assays require dilution of the sample. When this is the case, sample is first metered into a dilution vessel that is preferentially substantially similar to the wells previously described, except that these wells are not first treated with any reagent or other materials to which added reagent will adhere. That is to say, these wells are functionally inert within the context of the immunochemical reactions of interest. The proboscis 230 is used to meter the sample as in other assays. Each of the rings 250, 255 of the incubator include recesses along their respective curvatures into which reaction and dilution wells can be placed. Dilution wells are placed within the slots of the outer ring 250 of the incubator during the dilution operation. The reagent probe 100 meters and dispenses diluent into the diluent well. Preferably, diluent is added to the diluent well after the addition of sample, but it is possible to add this before or after any component. It is also possible, though less desirable, to configure assays so that reagent is added before addition of sample or before addition of diluent. After diluent is added, the diluent and sample are mixed by aspiration of reagent and sample in the proboscis 230 and dispensing the combined fluid back into the well 135. This process of mixing by aspiration and dispensing is referred to as "swish mixing". Upon completion of the mixing, proboscis 230 aspirates the diluted sample and dispenses it into a reaction vessel (e.g. well) on the outer ring 250 of the incubator for completion of the assay.

In the processing system of the analyzer, reaction wells containing sample, reagent, and (optionally) diluent are mixed with signal reagent and incubated. Chemiluminescence or other appropriate signal generation of the reaction of sample analyte and reagent(s) is also read in this system. Well wash arm 310 and well wash probe 315 are the principle components of the well wash subsystem whose function it is to wash the wells and to remove sample and unbound reagent (in that analyte is bound to the walls of the reaction vessel along with reagents that manifest the signal that is read later). As noted, each of the reaction vessels and dilution vessels are placed within recesses of the inner and outer rings 250, 255 of the incubator 300, whose rings are driven by pinions 257. Temperature and humidity are controlled within the incubator 300 for a time and temperature appropriate to the assays being performed. Incubation time can vary from assay to assay and is under the control of the data processing system of the analyzer.

The well wash probe 315, after appropriate incubation, is manipulated so that it aspirates sample and unbound reagent out of the reaction wells and then dispenses wash fluid into the wells, aspirates and dispenses wash fluid again for multiple washes. Additional information about this procedure is provided below, but for purposes of this background, and to this point in within the reaction wells, reagent and analyte have reacted and have been adhered to the well. The well wash arm 310 has removed materials that have not reacted and/or could otherwise interfere with sample reading.

Though not done in the present analyzer, it is also possible to configure the above instrument system so that the unmeasured materials would adhere to a reaction vessel and the contents of the vessel would be further processed or be subject to some reading. In such a case, they would then have to be aspirated and dispensed into another vessel.

Though the present description relates to heterogeneous immunoassays, it should be noted in passing that the present invention method is not limited to immunoassays (either heterogeneous or homogeneous in which there is no separation of bound/unbound reactants) and can be applied to any application in which multiple liquid additions are made, such as, for example, in the manufacture of pharmaceuticals or other chemical or biochemical reactions.

Upon completion of a well wash procedure, the well wash arm 310 articulates movably attached well wash probe 315 to a position to aspirate sample and unbound reagent and dispense wash fluid to the reaction vessel 135. Generally, wash fluid is dispensed as the well wash probe 315 is lifted out of the reaction vessel. The signal reagent subsystem comprises signal reagent arm 410, signal reagent probe 400, signal reagent packs 420, and prime/pump assembly 415 as its major components. The signal reagent probe 400 (which is preferably similar in design to the other metering probes previously described), which is movably attached to the signal reagent arm 410 aspirates, transports, and dispenses signal reagent from a signal reagent pack 420 to the wells. The signal reagent arm 410 is fitted to the prime/pump assembly 415 for this purpose. Signal reagent is a composition that contains a component that produces a signal upon combination with the reacted reagent/sample combination (e.g., luminol derivatives). A luminometer 500 is comprised of a fiber optic bundle 510 that communicates optically with a photomultiplier 520 which is in further communication with the data processing system 600 of the analyzer. In operation, the fiber optic bundle 510 is positioned over the sample with mixed reagent and, optionally, diluent. Chemiluminescent signals generated by the reacting reagent/sample combination are then transmitted to the photomultiplier 520, which converts the light signal into an electrical signal for processing according to conventional digital techniques. An internal reference (not shown) can be used for calibration of the luminometer 500.

A supply center 700 for storage and dispensing of wash fluids is also included. Typically, these fluids can be stored in a large container maintained under pressure by a pump. Appropriate fluidics such as tubes, pumps, and valves are used to drive the fluid to a working bottle that can be used to mix the fluid with other fluids prior to injection to one of the systems, such as the reagent management system. Here too, the fluids can be driven via appropriate fluidics using pumps generating a positive force or vacuum. A filter, such as a micropore filter, is generally placed in one or more of the fluidics lines prior to a point in which a fluid will be dispensed so that it is degassed enroute to the appropriate dispenser. This occurs as a result of the pressure gradient across the filter and leads to improved accuracy and precision in metering the fluid.

The data processing system 600 is an integrated array of circuitry used to coordinate the function of the systems and subsystems of the analyzer, conduct system diagnostics, calibrate instrumentation, and record and analyze results. This system 600 includes well known processing devices such as microprocessors and may be in electronic communication with any number of external processing systems. For example, this system 600 can be linked through a local area network to other analytical instrumentation so that tests are scheduled and results are compiled and reported for a number of different assays, some of which are not conducted on the instrument described herein.

Briefly summarizing and prior to further discussion in connection with the present invention, an assay is generally conducted using the above analyzer as follows, depending, for example whether the assay involves one or two stages, etc. First, reagent packs 105 containing reagents specific to the assays are loaded into the auto-load station 110. The reagent packs are then shuttled into the reagent supply substation 112 within the reagent supply carousel. Sample tubes are loaded into the sample carousel 220 which is placed into the sample conveyor. The sample conveyor 205 moves the sample carousel to a positioner 215 which rotates the sample tray so that the barcode reader 200 can input data about the identity of each sample tube into the data processing system 600 for assignment of tests and in preparation of result reports. The sample metering arm 245 moves proboscis 230 to a location above the sample tubes. The proboscis 230 (having an attached disposable tip) then is lowered into the tube and aspirates a predetermined volume of sample (typically approximately 10-80 µL).

A reagent pack 105 corresponding to an assay to be performed on the aspirated sample is then moved beneath well dispenser 175, where a reaction well or vessel is pushed into a well shuttle 125 and then into the outer ring 250 within the incubator 300. The outer ring 250 is then rotated to a position beneath the proboscis 230. The sample metering probe or proboscis 230 is then rotated to an appropriate position above the well 135 and dispenses a predetermined quantity of sample (e.g., between 10 and 80 µL) into the well corresponding to the assay to be performed. Reagent metering probe 100, which has been moved to an appropriate position by the reagent metering arm 145, is in a position atop the reagent pack 105. A predetermined quantity of reagent (approximately 20 and 160 µL) of reagent(s) are then aspirated, depending on the assay. The reagent metering probe 100 is then rotated to an appropriate position above the well 135 and dispenses reagent into the well corresponding to the assay to be performed. The well 135 is then rotated in the outer ring 250 of the incubator 300 for a time dependent upon the assay to be conducted and is then moved to a position on the inner ring 255 by shuttle 260. The well wash probe 310 dispenses wash solution, aspirates unbound reagent and/or sample and well wash solution, and evacuates the solution via system fluidics. The above well washing portion can be repeated depending on the assay. The inner ring 255 is then rotated into a position in which signal reagent can be dispensed into the well via signal reagent probe 400. The signal reagent arm 410 moves the signal reagent probe 400 into position above the well in the inner incubator ring, and a predetermined amount of signal reagent (e.g., about 200 µL) is dispensed by the pumps 415. The reaction well is then incubated for a time interval (e.g., approximately 5 minutes) and rotated to a position where it is accessible by the luminometer 500 that reads one or more chemiluminescent emissions, converts the signal to an electrical signal via the photomultiplier 520 and, passes the readings to the data processing system 600. The data processing system 600 then uses the signal to attain and communicate a clinical result. The well 135 is then discarded.

As noted, detection schemes are provided to determine whether incorrect fluid volumes have been dispensed. In the analyzer discussed herein, the well wash probe is equipped with a capacitance sense device which uses step motor counts to determine height of fluid within the reaction vessel. From understanding the nature of a nominal reaction well and the properties of the fluid involved, the volume of the well can then be calculated by means of a look-up table or other means.

The above detection scheme is referred to as DIVE (Direct In Well fluid Verification Enhancement) which originally was intended to detect incorrect levels of signal reagent (SR) in assay wells. DIVE measures either: 1. fluid height, 2. fluid volume, or 3. other converted fluid height in a reaction well using a fluid capacitance sense technique, and compares this metric to limits which have been determined to produce correct results. If the metric is within the prescribed limits, then the result is considered "good" and is reported by the data processing system of the analyzer; if the metric is outside the limits, the result is considered "bad" and is not reported.

With the above background discussion now completed, it has been realized that the well wash probe can be alternately used at various times during the above sequence to determine fluid volumes in a reaction well. More particularly, these measurements can be taken just prior to aspirating the sample and reactants from the reaction well following initial incubation, following each well wash dispense prior to aspiration of reactants and well wash, as well as the preceding verification of dispensed signal reagent just prior to luminometer measurements. Such detection measurements would appear to be useful, for example, to detect under or overdispense of well wash or other fluids so as to prevent flooding of the incubator or the reporting of compromised results.

Preferably and in each instance, the well wash probe is lowered via manipulation of the stepper motor with each step being counted by the data processing system 600 of the analyzer. Vertical drive resolution of about 39 steps per mm is preferred. The process continues until the tip of the well wash probe contacts the meniscus of fluid in the well. The height of the descent is then converted into a volumetric measurement of the total of sample, reagent, and/or signal reagent via a formula, or by reference to a table or database made from a formula or derived empirically. A suitable formula, for example, is readily derived by empirically establishing the proper height, graphically depicting the descent of the well wash probe until contact is made in a vessel (according to scale) using a commercial CAD software tool, and querying the CAD program to produce the equation that converts the height to volume.

In the foregoing procedure, it has been determined that a number of measurement errors can be attributed due to the geometry of a reaction vessel as well as other effects, which would normally indicate that an improper fluid volume has been dispensed when in fact an acceptable amount had been dispensed (a false positive), especially for smaller volumes that are dispensed. Some of these effects are shown pictorally in FIG. 1, wherein the discrepancies in reaction vessels are based on geometric tolerancing. In this example, an identical volume of a first fluid is depicted for a nominal reaction vessel 135, a large reaction vessel 135*a*, and a small reaction vessel 135*b*. Beneath the first set of reaction vessels is another set of similar reaction vessels 135, 135*a* and 135*b* containing an identical second volume of a second fluid. Using the above DIVE technique to sense fluid height and then extrapolate volume using a calibrated look-up table, it is clear that the representative heights (step counts) as measured by the well wash probe will vary greatly for each of the above reaction wells. In addition, as is shown by the comparison of heights of the two liquids, the meniscus of fluid also varies greatly depending on height of the fluid and the fluid matrix. It is therefore important to remove or significantly reduce the above effects in an effort to expand the scope of use for the present detection technique.

Figure 7:
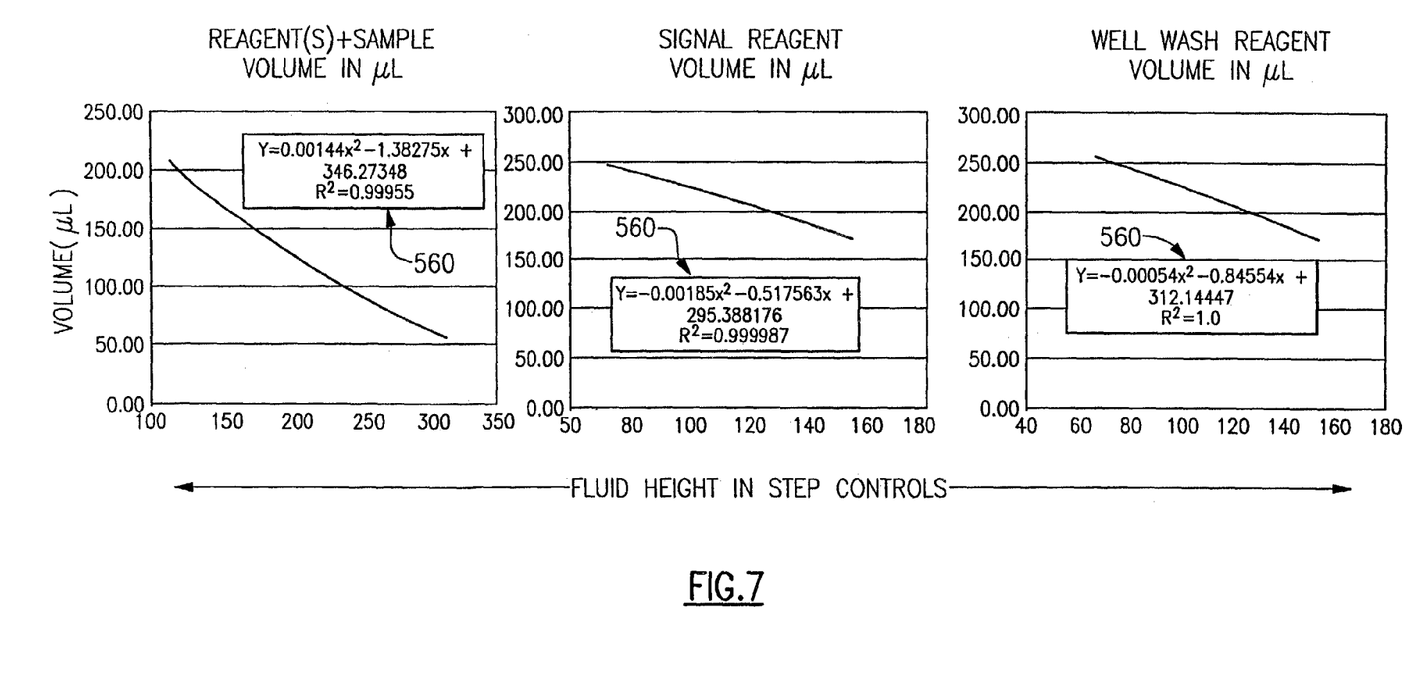
FIG. 7 illustrates plotted graphical representations of step counts versus fluid volume for reagent plus sample, signal reagent and well wash as added to a nominal reaction well and the resulting fitted equations that relate fluid height to fluid volume.

In order to determine the proper means to reduce the number of false positives or true negatives, a calibration was first obtained using three different analyzers of the type described above. In each, a series of sample and reagent, signal reagent and well wash fluids were added to a nominal reaction vessel 135 such as shown in FIG. 1. To perform this calibration, actual data was collected in which a reaction vessel is initially weighed so as to tare the weight of the cup in a later calculation and then a specific predetermined known dispense of fluid (SR, well wash, etc) was added to the cup. The specific step count was then determined using the detection probe. Following each measurement, the reaction vessel was weighed and the tared weight was eliminated. Fluid volume was then calculated based on the specific gravity of the fluid and the weight of the fluid. In this specific example, the reagent and sample (R+S) calibration was carried out over nine (9) levels covering 55-200 µL. In the signal reagent (SR) calibration, eight (8) levels were carried out covering 170-240 µL, and in the well wash (WW) calibration, five (5) levels were carried out covering 200-250 µL. 20 repetitions were carried out at each level and each calibration was repeated across each of the three analyzers. Referring to FIG. 7, each of the data for (R+S), SR and WW was plotted as step count versus volume and quadratic equations 560 were fitted for each calibration. For purposes of this calibration, a global calibration across all three analyzers is shown for each fluid, though it should be readily apparent that this data can be fitted to an individual analyzer.

Figure 8:
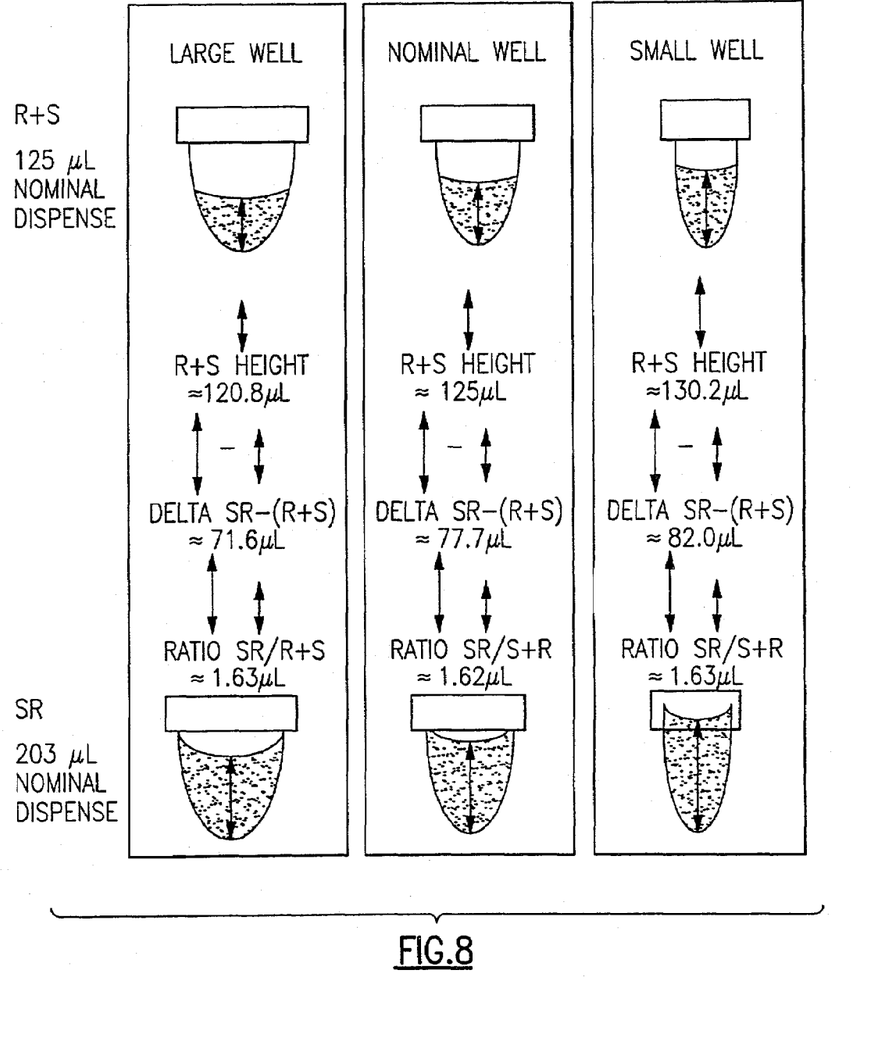
FIG. 8 is a schematic representation of modeled differences comparing direct height level, ratio level and delta level measurements between nominal, large and small wells in accordance with a stimulation using data from the calibration data of FIG. 7 to define possible contributions of the above measurements toward false positives.

With the above data having been gathered and referring to FIG. 8, a CAD simulation was then performed to introduce the effects resulting from large and small reaction vessels. In terms of adjusting these values, the meniscus volume is either subtracted or added from the volume measurement, depending on the type of well. That is, a meniscus volume is added given that the height measurement assumes a "flat volume" which forms the trough of the meniscus. These values can therefore be calculated for each large and small reaction well. In the example shown in FIG. 8, for a (R+S) of 125 µL, a large reaction well produces an apparent volume of approximately 120.8 µL, while a small reaction well produces a step height that produces an apparent volume of approximately 130.2 µL. Each of the above was reproduced for different fluid volume levels representing nominal, small and large reaction wells.

Still referring to FIG. 8, three approaches were utilized to handle the introduction of the above geometrical effects of simulated small and large reaction wells due to injection mold wear statistically using the CrystalBall® simulation program. For purposes of this simulation, normal fluid delivery was assumed at a number (4) of fluid levels and raw height data (in the form of step counts) from the preceding calibration set from a predetermined population was utilized. In the simulation, volume was then predicted from the derived quadratic formulae shown in FIG. 7. Using the information from the preceding CAD simulation, the volume was randomly adjusted for both (R+S) and SR volumes. The present example performed 5000 simulations from which volumes were deduced.

As noted, three approaches were utilized to simulate the occurrence of false positives which could occur using the previous calibration data due to the introduction of the CAD simulation. The first approach was a straight forward height approach based on step count for the (R+S) volume. In the example shown in FIG. 8, the range of heights (max-min) for height is equal to about 9.4 µL. The second and third approaches utilized arithmetic operations on more than one liquid height measure as a means to normalize variation.

More particularly, the second approach utilized a delta in which the reagent plus sample (R+S) volume measurement is subtracted from the signal reagent (SR) volume measurement. In the example shown in FIG. 8, a nominal signal reagent dispense is equal to about 203 microliters and the representative deltas are shown for a large, nominal and small reaction well, respectively, wherein the (max-min) for delta is equal to about 5.9 µL.

The third approach utilizes a ratio between the signal reagent (SR) and the reagent plus sample (R+S) measurements. In the example shown in FIG. 8 and for each of the large, nominal and small reaction wells, it is shown that the ratios are each nearly equal to one another (1.62 or 1.63). In this instance, the (max-min) volume differences for ratios is approximately 0.8 µL.

Figure 9:
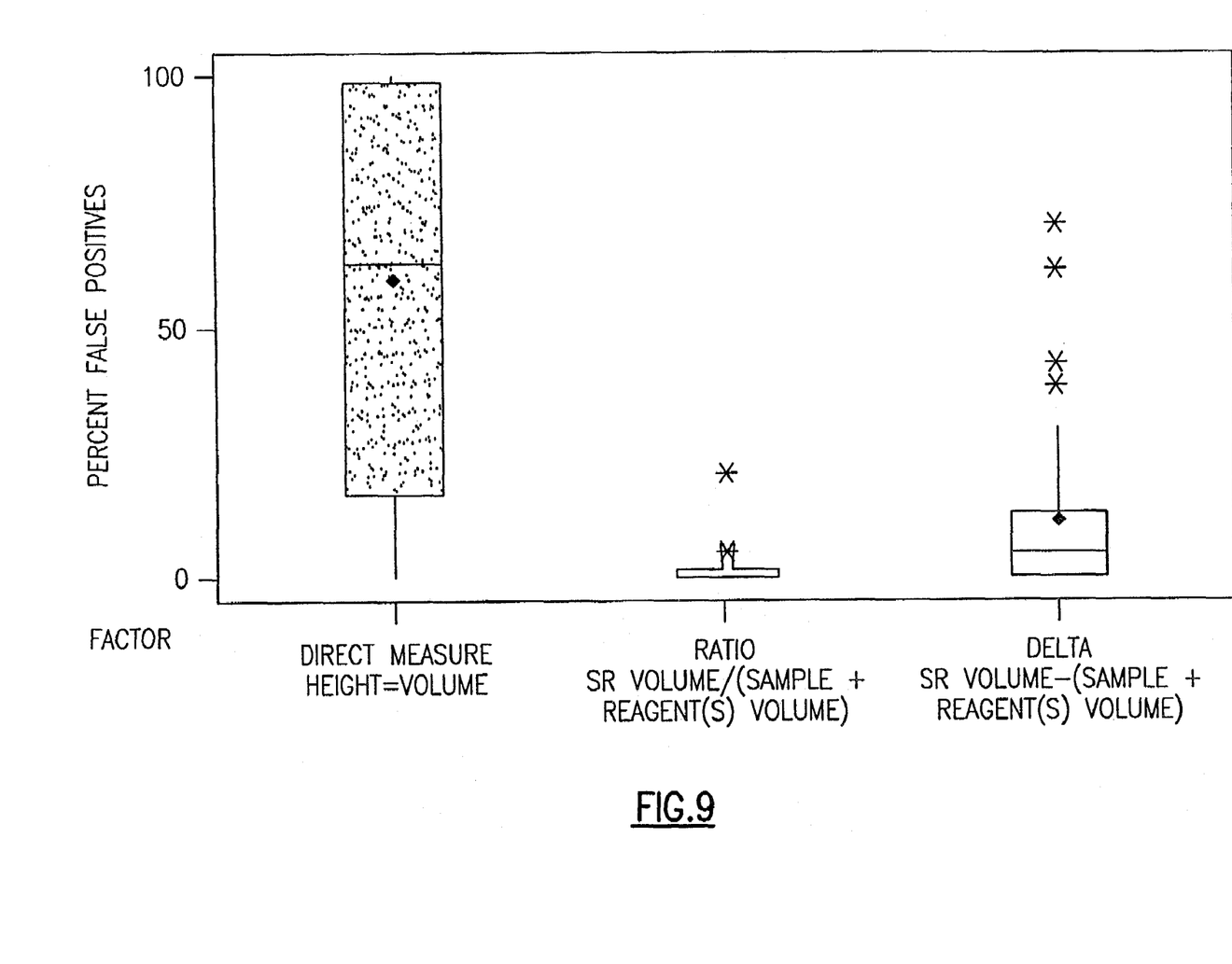
FIG. 9 is a graphical representation of the percent occurrences of false positives from the simulation of FIGS. 7 and 8.

Turning to FIG. 9, the percent of false positives occurring during the entire simulation are shown for each above approach. As is clear from the Fig, the percentage of false positives using height alone greatly exceeds those of the ratio and delta detection schemes hence volume bias can be normalized substantially by using either the delta and more preferably the ratio approach, depending on the tolerance required.

The above indicates that additional measurements using the DIVE detection scheme can be performed and that additional checks can be adequately performed during assay preparation. The ratio and delta approaches can be used to more closely detect errors resulting from factors other than reaction well geometry or other error budget components previously discussed, when compared to direct height measurements alone. Turning to the logic diagram of FIG. 10, an exemplary two-tiered branched decision process is illustrated which incorporates both height and delta/ratio detection techniques wherein the ratio can be used as a "fine" filter, the delta can be used as an "intermediate" filter, and the height measurement can be used as a "coarse" filter. Other schemes can be realized and are contemplated within the scope of the present invention.

Figure 10:
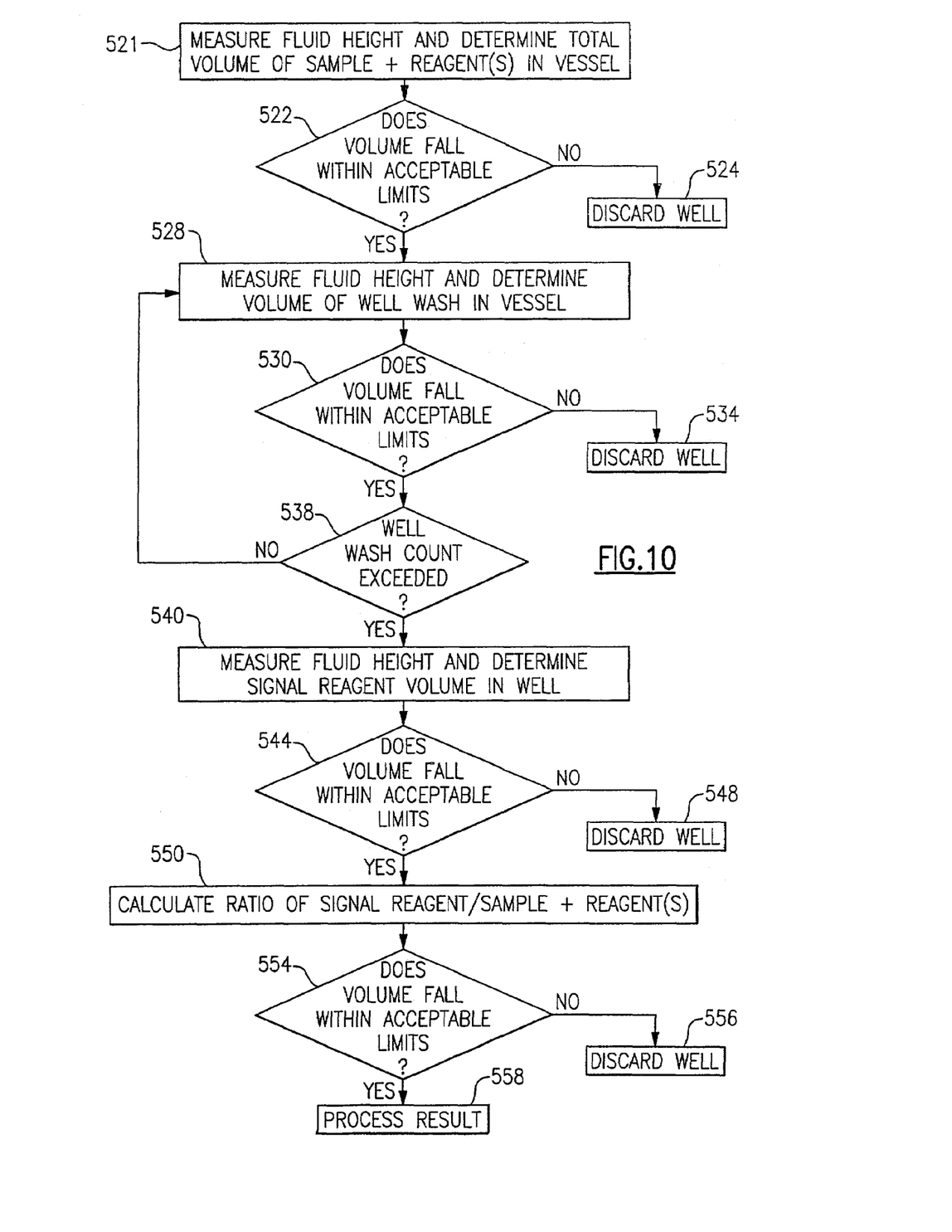
FIG. 10 is a diagrammatic logic sequence utilizing height and ratio measurements in a detection scheme in accordance with a preferred embodiment of the present invention.

An exemplary logic sequence is illustrated in the flowchart of FIG. 10 utilizing a combined height and ratio detection logic. Other variations would certainly be considered which include any of the above methodology. According to this example, an initial total reagent and sample volume determination is made, shown as step 521, and this measurement is compared to an acceptable tolerance limit, step 522. In this instance and for Health and Safety Assays, a tolerance limit of +28, −25 microliters from a target volume, dependent on the assay, is used. This particular tolerance limit is well within the capabilities of the height/volume (DIVE) measuring technique alone irrespective of the well geometry and other error budget effects previously described. Therefore and according to this technique, if this measurement is outside the above interval, the reaction well is discarded with no further processing, step 524. Otherwise, processing continues.

Another fluid height measurement is made following well wash dispense, step 528, and this measurement is also compared to an acceptable tolerance limit or volume range, step 530. A target volume is about 230-235 µL and an acceptable tolerance limit is between about 215 and 250 µL. These limits are also easily within the range of the typical fluid height/volume measuring technique. As in the preceding and if the measurement is outside the tolerance limit, then the well is discarded, step 534. Otherwise, processing continues. The above steps can be repeated for subsequent well washes depending on the assay based on a predetermined well wash count, step 538. Each of these measurements are useful, for example, to detect the presence of no reaction well or the presence of a cracked or damaged reaction well in addition to under and over dispense conditions. If any measured values are exceeded using this filter, then processing is aborted and additional fluid delivery is stopped.

Another similar fluid height/volume measurement is made, step 540, following the dispense of signal reagent (e.g., an intended target of approximately 200 μL) as dispensed into the reaction well and this value is also compared to an acceptable tolerance limit, step 544 (e.g., +28, −25 μL) from the intended target. If the measured volume, as determined by DIVE, falls outside of the interval set at +28, −25 μL, then the well is discarded, step 548.

If the measured volume falls within the above interval, then a ratio is calculated in which the preceding SR measurement is divided by the (R+S) measurement, step 550. This calculated ratio is then compared to an acceptable level, step 554, or target ratio that is based on a look-up table interval which has been derived for the specific assay. The target ratio is based in part on the fluid matrix which produces an offset or bias and an acceptable range covering min and max ratios can be established which include this bias effect. If the ratio exceeds the interval, step 556, then the well is discarded and the results are not reported. If the ratio falls within the interval, then the calculated ratio indicates that the test volume is within an acceptable volume limit, step 558, and the results are reported.

PARTS LIST FOR FIGS. 1-10

100 reagent probe
105 reagent packs
110 autoload station
112 reagent supply substation
120 reagent supply cooler
125 reagent well shuttle
135 reaction wells
135a large reaction well
135b small reaction well
145 reagent metering arm
160 outlet port
165 probe wash station
170 inlet port
175 wash cylinder
200 bar code reader
205 sample tray conveyor
210 sample tray transports
215 sample positioner
220 carousel
230 proboscis
245 metering arm
250 ring, outer
255 ring, inner
256 recesses
257 pinion
260 shuttle
300 incubator
310 well wash arm
315 well wash probe
400 signal reagent probe
410 signal reagent arm
415 prime/pump assembly
420 signal reagent (packs)
500 luminometer
510 fiber optic bundle
520 photomultiplier
521 step
522 step
524 step
528 step
530 step
534 step
538 step
540 step
544 step
548 step
550 step
554 step
556 step
558 step
560 equations
600 data processing system
700 supply center Modifications and variations are possible as will be apparent to one of sufficient skill which are within the spirit and intended scope of the invention.

We claim:

1. A method for improved measurement of fluid volumes in a reaction vessel obtained by adding at least two fluids into the reaction vessel, wherein the method takes into account the geometry of the reaction vessel and properties of each fluid, the method comprising the steps of:
    developing a mathematical algorithm for each of the at least two fluids by correlating a height of an aliquot of each of the at least two fluids added to a standard reaction vessel, wherein the height is measured by a sensor with a volume of the aliquot of each of the at least two fluids, wherein the volume is calculated from independent gravimetric measurements;
    adding a first volume of a first fluid from the at least two fluids to said reaction vessel;
    measuring the first volume of the first fluid contained in said reaction vessel by sensing the height of the first fluid in said vessel using the sensor and calculating the volume based on said sensed height using the mathematical algorithm for the first fluid;
    adding a second volume of a second fluid from the at least two fluids to said reaction vessel;
    measuring the second volume of the second fluid contained in said reaction vessel by sensing the height of the second fluid in said vessel using the sensor and calculating the volume based upon the sensed height using the mathematical algorithm for the second fluid;
    calculating at least one of the ratio and the delta between the first and second measured volumes;
    comparing the at least one calculated ratio and delta to a known reference for the standard vessel; and
    discarding the reaction vessel if the difference between the at least one calculated ratio and delta and the known reference exceeds a predetermined range of values.

2. A method as recited in claim 1, wherein the first fluid is added using a first metering device and the second fluid is added using a second metering device that is separate from the first metering device.

3. A method as recited in claim 1, wherein the second fluid volume measuring step can be made with or without the step of removing at least a portion of the first fluid volume from the reaction vessel prior to said measuring step.

4. A method as recited in claim 1, wherein each of said fluid volume adding steps are performed using the same metering device.

5. A method as recited in claim 4, wherein the step of measuring the second fluid volume can be made with or without removing at least a portion of the first fluid volume from the reaction vessel prior to said measurement step.

6. A method as recited in claim 1, including the additional steps of:

developing a mathematical algorithm for at least one additional fluid to be added to said reaction vessel, said algorithm being developed by correlating a height of an aliquot of said at least one additional fluid added to a standard reaction vessel, wherein the height is measured by a sensor with a volume of the aliquot of each of the fluids, wherein the volume is calculated from independent gravimetric measurements;

adding at least one volume of said at least one additional fluid to said reaction vessel following said second fluid volume measuring step;

calculating at least one of the ratio and the delta between any of the fluid volume measurements obtained; and     comparing the at least one calculated ratio and delta to a known standard.

7. A method as recited in claim 1, wherein each of said measuring steps include the step of sensing the fluid height within the reaction vessel using a capacitance level sensor.

8. A method as recited in claim 1, wherein each of said measuring steps include the step of sensing the fluid height within the reaction vessel using a pressure level sensor.

9. A method as recited in claim 1, wherein said method is performed within a clinical analyzer.

10. A method of compensating for manufacturing tolerance effects of a reaction vessel for purposes of performing volumetric measurements of liquids added to said reaction vessel in a clinical analyzer, said method comprising the steps of: providing said clinical analyzer including at least one metering device for aspirating liquids from at least one liquid supply of said analyzer and adding aspirated liquids to said reaction vessel;

developing a mathematical algorithm for each of at least two liquids by correlating a height of an aliquot of each of the at least two liquids added to a standard reaction vessel, wherein the height is measured by a sensor with a volume of the aliquot of each of the at least two liquids, wherein the volume is calculated from independent gravimetric measurements;

adding a first volume of a first liquid into a reaction vessel using a metering device of said analyzer;

measuring the first volume of said at least first added liquid by sensing the height of liquid in said vessel using the sensor and calculating the volume based on said sensed height using the mathematical algorithm of the first liquid;

adding a second volume of a second liquid into said reaction vessel using the same metering device used to add the volume of the first liquid;

measuring the second volume of said at least second added liquid by sensing the height of liquid in said vessel using the sensor and calculating the volume based upon the sensed height using the mathematical algorithm of the second liquid; and     calculating at least one of the delta and the ratio between the first liquid volume and the second liquid volume;

comparing the at least one calculated ratio and delta to a known reference for the standard reaction vessel; and     discarding the reaction vessel if the difference between the at least one calculated ratio and delta and the known standard exceeds a predetermined range of values.

11. A method as recited in claim 10, wherein said first liquid is a mixture of fluids containing a patient sample having an unknown rheology and the second liquid is a fluid with a known rheology.

12. A method as recited in claim 10, wherein said first liquid is a fluid with a known rheology and the second liquid is a fluid containing an unknown rheology.

13. A method as recited in claim 10, wherein the first liquid is added to a reaction vessel using a first metering device and the second liquid is added to the reaction vessel using a second separate metering device of said clinical analyzer.

14. A method as recited in claim 10, wherein said sensor is a capacitance level sensor.

15. A method as recited in claim 10, wherein said sensor is attached to said metering device.

* * * * *